United States Patent [19]

Stoffel

[11] Patent Number: 5,198,023
[45] Date of Patent: Mar. 30, 1993

[54] CATIONIC DYES WITH ADDED MULTI-VALENT CATIONS TO REDUCE BLEED IN THERMAL INK-JET INKS

[75] Inventor: John L. Stoffel, San Diego, Calif.

[73] Assignee: Hewlett-Packard Company, Palo Alto, Calif.

[21] Appl. No.: 904,752

[22] Filed: Jun. 26, 1992

[51] Int. Cl.$^5$ .............................................. C07D 11/02
[52] U.S. Cl. ................................ 106/22 R; 106/20 D; 106/22 A
[58] Field of Search ..................... 106/20, 22

[56] References Cited

U.S. PATENT DOCUMENTS

| | | | |
|---|---|---|---|
| 4,279,653 | 7/1981 | Makishima et al. | 106/22 |
| 4,505,749 | 3/1985 | Kanekiyo et al. | 106/22 |
| 4,554,555 | 11/1985 | Aruga et al. | 106/20 |
| 4,818,285 | 4/1989 | Causley et al. | 106/22 |
| 5,108,504 | 4/1992 | Johnson et al. | 106/22 |
| 5,116,409 | 5/1992 | Moffatt | 106/22 |
| 5,118,350 | 6/1992 | Prasad | 106/22 |
| 5,143,547 | 9/1992 | Kappele | 106/22 |
| 5,145,519 | 9/1992 | Kappele | 106/22 |

*Primary Examiner*—Mark L. Bell
*Assistant Examiner*—Helene Klemonski

[57] ABSTRACT

An ink set is provided in which bleed between yellow and black inks is reduced by using a cationic yellow dye in the yellow ink and an anionic dye in the black ink. Bleed is further reduced by adding a multi-valent precipitating agent to the yellow ink. With regard to bleed between yellow and other color inks (cyan and magenta), bleed is reduced by also employing anionic dyes in the color inks.

16 Claims, No Drawings

CATIONIC DYES WITH ADDED MULTI-VALENT CATIONS TO REDUCE BLEED IN THERMAL INK-JET INKS

TECHNICAL FIELD

The present invention relates to ink-jet inks employed in ink-jet printing, and, more particularly, to the addition of a multi-valent cation, such as calcium, to a cationic dye to reduce color bleed between colors printed adjacent one another.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the ink composition.

Many thermal ink-jet inks, when printed in various colors on bond paper, copier paper, and other media, can lead to bleed. Bleed occurs as colors mix both on the surface of the paper being printed on and in the paper. The term "bleed", as used herein, is defined as follows: When inks of two different colors are printed next to each other, it is desired that the border between the two colors be clean and free from the invasion of one color into the other. When one color does invade into the other, the border between the two colors becomes ragged, and this is called bleed.

This is in contradistinction to uses of the term in the prior art, which often defines "bleed" in the context of ink of a single color following the fibers of the paper.

Prior solutions to bleed have largely involved the use of heated platens or other heat sources and/or special paper. Heated platens add cost to the printer. Special paper limits the user to a single paper, which is of a higher cost than a "plain" paper. Another way to reduce bleed involves increasing the penetration rate of the ink into the paper. However, increasing the penetration rate reduces the edge acuity (lowers the print quality of the ink). Nevertheless, this method is acceptable for printing color inks because of the lesser importance of color text quality. However, print quality is important for black ink, and hence alternate bleed control mechanisms are needed.

A need remains for ink compositions for use in ink-jet printing, particularly thermal ink-jet printing, which do not evidence bleed, as defined herein, when printed on plain papers, and yet which possess relatively long shelf life and other desirable properties of such inks.

DISCLOSURE OF INVENTION

In accordance with the invention, an ink set is provided in which bleed between color and black is reduced by using at least one cationic yellow dye in yellow ink and at least one anionic dye in black ink. This ink formula is very effective in reducing black-to-yellow bleed without requiring the black ink to penetrate quickly. Multi-valent cations are added to the yellow ink to further reduce bleed.

BEST MODES FOR CARRYING OUT THE INVENTION

In considering the problems of bleed reduction involving a set of cyan, magenta, yellow, and black inks, which, when printed in various combinations, provide all of the color combinations, it is important to note that yellow ink is the worst bleeder visually because of the contrast between yellow and any of cyan, magenta, and black inks. That is to say, all other things being equal, bleeding is not as visually apparent between any combination of cyan, magenta, and black inks as it is between yellow ink and any of these inks. Accordingly, a solution to bleed reduction need only deal with reducing bleed between yellow ink and the other inks in the ink set.

In one approach, the black dye employed in the black ink is an anionic dye, such as Food Black 2 or Direct Black 19. Any of the anionic dyes known for use in ink-jet printing may be employed in the practice of the invention. The color inks all comprise cationic dyes; any of the cationic dyes known for use in ink-jet printing may be employed in the practice of the invention. Examples of cationic cyan dyes include any of the oxazine dyes, such as Basic Blue 3. Examples of cationic magenta dyes include any of the polymethine dyes, such as Basic Violet 7. Examples of cationic yellow dyes include any of the Basic Yellow inks, such as Basic Yellow 13 from the cyanine class and Basic Yellow 51 from the methine class of Basic Yellows. However, a drawback to this approach is that there is bleed between cyan and yellow, between magenta and yellow, and between cyan and magenta.

In another approach, all of the dyes except yellow are anionic. Examples of anionic cyan dyes include Acid Blue 9. Examples of anionic magenta dyes include Direct Red 227. The yellow dye is cationic, examples of which are given above.

In this second approach, there is still bleed between cyan and magenta, cyan and black, and magenta and black. However, the bleed between these pair of dyes is considerably less than the bleed between yellow and black in the prior art approach, and in accordance with the invention, the worst case bleed, between yellow and black, is noticeably improved.

A precipitating agent has been found which, when added to yellow ink, further reduces bleed. This precipitating agent comprises a multi-valent salt. Examples of multi-valent salts employed in the practice of the invention include bivalent salts, such as calcium chloride and magnesium chloride, and trivalent salts, such as aluminum chloride and ferric chloride. In place of the chloride anion, fluoride and nitrate anions may be employed.

The concentration of the precipitating agent ranges from about 1 to 10 wt % of the ink composition. Less than about 1 wt % is not effective in precipitating out the anionic dye, while greater than about 10 wt % results in precipitation of the cationic dye from the yellow ink; such precipitation of the cationic dye is, of course, undesirable. Preferably, the yellow ink includes about 3 wt % of the precipitating agent.

Inks employed in the practice of the invention comprise, in general, about 5 to 15 wt % of at least one of diethylene glycol and 2-pyrrolidone, about 0.3 to 4 wt % dye, about 0.05 to 0.5 wt % biocide, about 0.1 to 3 wt % of a surfactant (in the cyan, magenta, and yellow inks), and the balance water.

All concentrations herein are in weight percent, unless otherwise indicated. The purity of all components is that employed in normal commercial practice for thermal ink-jet inks.

Any of the biocides commonly employed in ink-jet inks may be employed in the practice of the invention, such as NUOSEPT 95, available from Hüls America (Piscataway, N.J.), PROXEL CRL, available from ICI Americas (Wilmington, Del.), and glutaraldehyde, available from Union Carbide Company (Bound Brook, N.J.) under the trade designation UCARCIDE 250. Preferably, 0.3 wt % NUOSEPT 95 is employed with the yellow, magenta, and cyan inks, while 0.08 wt % PROXEL CRL is employed with the black ink.

The purpose of the surfactant is to increase penetration of the ink into the print medium. In this regard, SURFYNOL 465, which is an acetylenic polyethylene oxide surfactant available from Air Products & Chemicals, Inc., is suitably employed in the practice of the invention. The SURFYNOLS are represented as

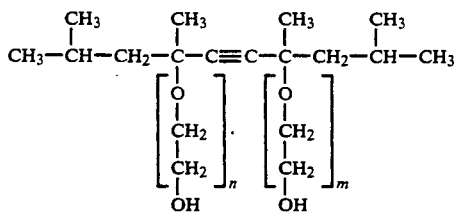

where n+m=0 to 50.

The preferred inks comprise about 10 wt % diethylene glycol, about 1.5 wt % dye, the biocide and surfactant, and the balance water. For maximum improvement in bleed reduction between yellow and the other inks, the yellow ink further includes the precipitating agent, as indicated above.

INDUSTRIAL APPLICABILITY

The inclusion of a multi-valent salt as a precipitating agent in yellow ink containing cationic yellow dye is expected to find use in inks employed in thermal ink-jet printing.

EXAMPLES

A number of yellow inks were prepared, most with cationic dye (Basic Yellow 13 or Basic Yellow 51) and some with anionic dye (Acid Yellow 23) for comparison. Also, a precipitating agent was added to the cationic dye. The amount of dye in each case was 1% of the ink. The dye, the precipitating agent (if present), the amount of precipitating agent, the solvent (2-pyrrolidone or diethylene glycol), and the amount of solvent for each yellow ink are shown in the Table below. The balance was water.

Also prepared were two black inks, one containing Food Black 2 (2.3 wt %) and the other Direct Black 19 (3.0 wt %). The balance was water. A bleed pattern comprising a plurality of lines of one of the black inks was printed, along with a solid portion of one of the yellow inks adjacent the black lines, with the colors just touching; the particular combination of black and yellow inks is indicated in the Table. The amount of bleed was measured from invasion of black ink into yellow ink. The value listed in the Table is the percent of reduction of the yellow box area caused by the black invasion.

TABLE

Amount of Bleed Between Black and Yellow Inks.

| Dye | Pptg. Agent | Solvent | % Bleed | Black Ink |
|---|---|---|---|---|
| BY13 | 1% CaCl$_2$ | 8% 2P | 8.2 | FB2 |
| BY13 | 3% CaCl$_2$ | 8% 2P | 5.6 | FB2 |
| BY13 | 3% CaNO$_3$ | 8% 2P | 6.1 | FB2 |
| BY13 | 1% Al$_2$(NO$_3$)$_3$ | 8% 2P | 7.1 | FB2 |
| BY13 | 1% MgSO$_4$ | 8% 2P | 10.2 | FB2 |
| BY13 | 1% CaCl$_2$ | 10% DEG | 8.1 | FB2 |
| AY23 | — | 5.5% DEG | 12.4 | FB2 |
| BY13 | 1% CaCl$_2$ | 10% DEG | 7.5 | FB2 |
| BY13 | 1% CaCl$_2$ | 8% 2P | 7.1 | DB19 |
| BY13 | 3% CaCl$_2$ | 8% 2P | 5.2 | DB19 |
| BY13 | 3% CaNO$_3$ | 8% 2P | 4.9 | DB19 |
| BY13 | 1% Al$_2$(NO$_3$)$_3$ | 8% 2P | 6.0 | DB19 |
| BY13 | 1% MgSO$_4$ | 8% 2P | 8.5 | DB19 |
| AY23 | — | 5.5% DEG | 11.5 | DB19 |
| BY51 | 3% CaCl$_2$ | 8% 2P | 5.7 | DB19 |

The use of an anionic yellow dye without the precipitating agent is seen to result in relatively high bleed. Bleed is seen to be reduced by employing yellow inks containing both cationic yellow dyes and precipitating agents in conjunction with black inks containing anionic dyes.

Thus, there has been disclosed an ink-jet set for thermal printing in which color bleed is reduced. It will be readily apparent to those skilled in this art that various changes and modifications of an obvious nature may be made without departing from the spirit of the invention, and all such changes and modifications are considered to fall within the scope of the invention as defined by the appended claims.

What is claimed is:

1. An ink-jet ink set for thermal ink-jet printing comprising cyan, magenta, yellow, and black inks, wherein said black ink includes at least one anionic dye and wherein said yellow ink includes (a) at least one cationic dye and (b) about 1 to 10 wt % of a multi-valent precipitating agent.

2. The ink-jet ink set of claim 1 wherein said cyan and magenta inks each include at least one anionic dye.

3. The ink-jet ink set of claim 1 wherein said cyan and magenta inks each include at least one cationic dye.

4. The ink-jet ink set of claim 1 wherein said multi-valent precipitating agent comprises at least one salt comprising anions selected from the group consisting of chloride, fluoride, and nitrate anions and cations selected from the group consisting of calcium, magnesium, aluminum, and ferric cations.

5. The ink-jet ink set of claim 4 wherein said multi-valent precipitating agent consists essentially of calcium chloride.

6. The ink-jet ink set of claim 1 wherein said multi-valent precipitating agent is present in an amount of about 3 wt %.

7. The ink-jet ink set of claim 1 wherein each of said inks comprises about 5 to 15 wt % of at least one of diethylene glycol and 2-pyrrolidone, about 0.3 to 4 wt % dye, about 0.05 to 0.5 wt % biocide, about 0.1 to 3 wt % surfactant, and the balance water.

8. The ink-jet ink set of claim 7 wherein each of said inks comprises about 10 wt % diethylene glycol, about 1.5 wt % dye, and the balance water.

9. A method of reducing color bleed between yellow and other colors in a cyan, magenta, yellow, and black ink dye set, comprising formulating said black ink with at least one anionic dye and formulating said yellow ink with at least one cationic dye and with about 1 to 10 wt % of a multi-valent precipitating agent.

10. The method of claim 9 comprising further formulating said cyan and magenta inks with at least one anionic dye each.

11. The method of claim 9 comprising further formulating said cyan and magenta inks with at least one cationic dye each.

12. The method of claim 9 wherein said multi-valent precipitating agent comprises at least one salt comprising anions selected from the group consisting of chloride, fluoride, and nitrate anions and cations selected from the group consisting of calcium, magnesium, aluminum, and ferric cations.

13. The method of claim 12 wherein said multi-valent precipitating agent consists essentially of calcium chloride.

14. The method of claim 9 wherein said multi-valent precipitating agent is present in an amount of about 3 wt %.

15. The method of claim 9 wherein each of said inks comprises about 5 to 15 wt % of at least one of diethylene glycol and 2-pyrrolidone, about 0.3 to 4 wt % dye, about 0.05 to 0.5 wt % biocide, about 0.1 to 3 wt % surfactant, and the balance water.

16. The method of claim 15 wherein each of said inks comprises about 10 wt % diethylene glycol, about 1.5 wt % dye, and the balance water.

* * * * *